United States Patent [19]

Laing

[11] Patent Number: 4,730,989
[45] Date of Patent: Mar. 15, 1988

[54] ROTODYNAMIC PUMP WITH SPHERICAL BEARING

[76] Inventor: Karsten Laing, 632 Marsat Ct., Chula Vista, Calif. 92011

[21] Appl. No.: 895,962

[22] Filed: Aug. 12, 1986

Related U.S. Application Data

[63] Continuation-in-part of Ser. No. 695,915, Oct. 11, 1984, abandoned.

[51] Int. Cl.$^4$ .................... F04B 17/00; F04B 35/04
[52] U.S. Cl. .................................. 417/357; 417/420; 384/108
[58] Field of Search ............... 417/420, 365, 366, 371, 417/423 R, 357; 384/108, 109, 126, 240, 241, 245; 310/90, 91, 166, 86, 87, 254, 217, 218, 104, 52, 54, 51, 62, 63

[56] References Cited

U.S. PATENT DOCUMENTS

| 2,258,028 | 10/1941 | Neal et al. | 384/241 |
| 2,722,463 | 11/1955 | Shaw et al. | 384/108 |
| 2,939,399 | 6/1960 | Rutschi | 417/357 |
| 3,265,452 | 8/1966 | Pan et al. | 384/109 |
| 3,799,629 | 3/1974 | Laing | 384/108 |
| 3,803,432 | 4/1974 | Laing | 310/90 |

FOREIGN PATENT DOCUMENTS

| 2135529 | 1/1980 | Fed. Rep. of Germany | 417/420 |
| 1212481 | 11/1970 | United Kingdom | 384/245 |
| 2101695 | 1/1983 | United Kingdom | 384/108 |

Primary Examiner—Carlton R. Croyle
Assistant Examiner—Donald E. Stout
Attorney, Agent, or Firm—Pennie & Edmonds

[57] ABSTRACT

The invention relates to canned pumps which form a unit with a spherical electric motor (hereinafter referred to as "spherical pumps"). A rotating unit, made up of the rotor and the impeller is supported by a spherical bearing. This spherical bearing has a self-cleaning property, preventing accumulation of dirt particles within the lubricating film.

5 Claims, 6 Drawing Figures

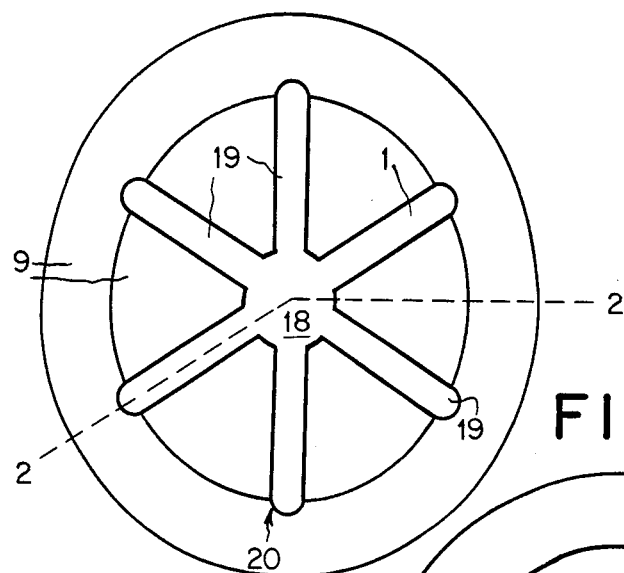
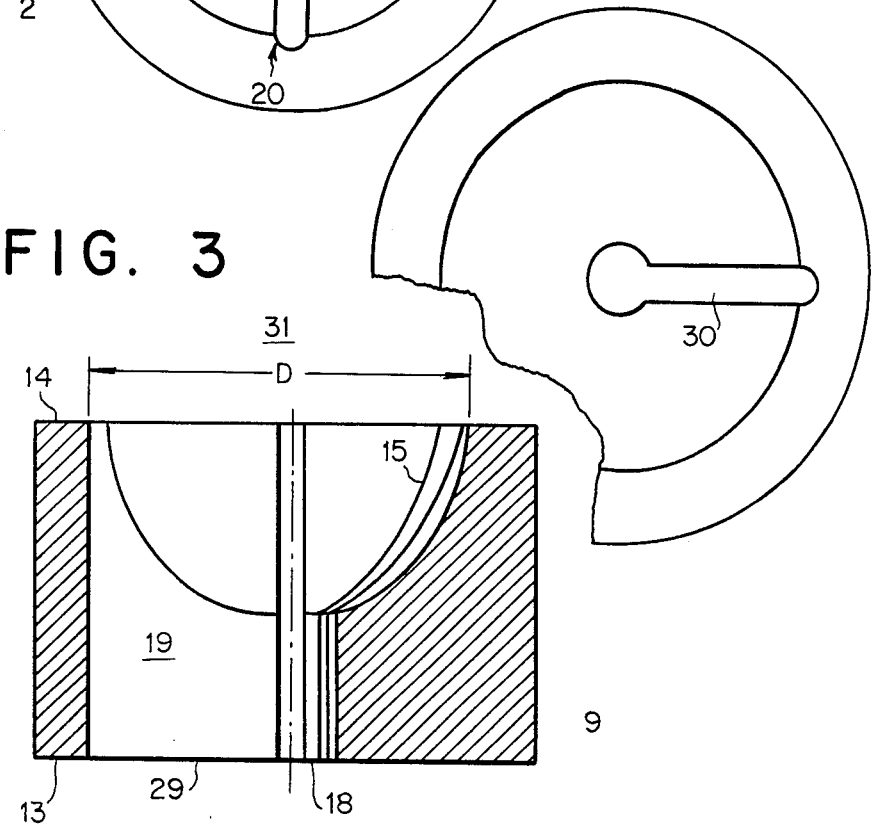

ROTODYNAMIC PUMP WITH SPHERICAL BEARING

This application is a continuation-in-part of application Ser. No. 659,915, filed Oct. 11, 1984 and now abandoned.

BACKGROUND OF THE INVENTION

Spherical pumps are in many aspects superior to the well known canned pumps that have shaft and bushings rotating in the liquid conveyed. The working clearance within the bushings tends to clog because the friction caused temperature of the liquid conveyed. The working clearance within the bushings tends to clog because the friction caused temperature within the bearing clearance space is higher than the temperature of the liquid conveyed. In addition, scaling, especially from calcium components, will build up in this space. In addition, the leakage flux of the motor runs generally parallel to the clearance within the bushings, attracting ferro-magnetic particles such as rust into the clearance. A large amount of clogging causes seizing, the main reason for failure of canned pumps. The most important advantage of spherical pumps is the fact that they have neither shafts nor bushings. Therefore, seizing within the spherical bearings is considerably less probable; nevertheless, spherical bearings can also seize, caused by ad-mixtures to the fluid conveyed. These ad-mixtures have the tendency to accumulate within the clearance, forming a viscid layer.

The aim of the invention is the prevention of buildups within the bearing clearance that may cause seizing. The invention makes use of a new design of spherical bearings, characterized by grooves with a radial extension exceeding the radius of the ball and mounted between pressure side and suction side of the pump.

Spherical bearings are known. GB No. 2,101,695 shows a spherical bearing with a rotating ball. Around the periphery of said ball are spirally curved grooves 17, causing grease 21 to move from the periphery to the drain hole 8 in the center at the deepest point of the spherical cap 2. As shown by the two arrows, the grease recirculates slowly from the lower level 20 to the upper level 21. A similar design is shown in GB No. 1,212,481 forming a vertically loaded journal bearing for high speed shafts. Here also the shaft 4 with a semi-spherical end 6 rotates in a cap-shaped recess 7 with a bore 10. The oil flows here also from the outer diameter of the semi-spherical end to the nadir of the recess 7 and from there through channel 9 back to the sump. In both bearings the lubricant is driven against the centrifugal forces in the bearing clearance. This flow pattern would not be applicable to fluids containing dirt particles. Dirt particles would accumulate around the inner periphery of the spherical cap.

SUMMARY OF THE INVENTION

The invention overcomes the danger of seizing. According to the invention, the spherical bearing consists of bearing cap and a ball with self-cleaning properties. To fulfil the aim of the invention, it is necessary to prevent build-up of high temperature in the bearing clearance and to expel any build-up of scaling or dirt accumulation. This is achieved by the following features:

a. In contrast to prior art, the ball is stationary mounted and the bearing cap rotates.

b. The bearing cap is penetrated by radial channels having walls parallel to the axis.

c. The radial extension of these channels exceeds the radius of the ball.

d. The channels are located between the pressure side and the suction side of the impeller, resulting in strong flow of liquid, in contrast to prior art, toward the ball.

By this means a certain amount of liquid, considerably higher than any amount needed for lubrication purposes, streams continuously at high velocity over the surface of the ball so that wear caused by friction will be dissipated. Furthermore, dirt particles, insofar as they are heavier than the liquid conveyed, are forced by the centrifugal forces of the rotating bearing cap into said channels and flushed away by the stream of liquid.

Tests have shown that these bearings seize under no practical mode of operation. The single exception is that particles with a lower specific weight than the fluid will accumulate. Fortunately, in practically all known fields of application, dirt particles are heavier than the liquid.

According to the invention, the channel in the center extends through the bearing cap, connecting the pressure side of the pump to the sliding surface. At least one radially extending slot-shaped channel passes through the bearing cap with its outer terminus lying beyond the circumference of the ball as measured at 90 degrees to the axis of rotation.

Preferably, the bearing cap is constructed by forming an elongated mold member that has a transverse sectional configuration with the center channel and one or more slot-shaped channels merging with the center channel. A piston molding member has internal conduit parts for fitting onto the elongated mold member for compressing the powder of the bearing material, and molding cavities form between the elongated mold member and the piston.

BRIEF DESCRIPTION OF THE DRAWINGS

FIG. 2 is a top plan view of a bearing seat constructed according to the invention.

FIG. 3 is a side elevation view of the bearing seat of FIG. 2 taken along line 2—2 of FIG. 2.

FIG. 4 is a side elevation sectional view of one form of the molding apparatus for making the bearing seat of FIGS. 2 and 3 taken along line 3—3 of FIG. 5.

DESCRIPTION OF THE PREFERRED EMBODIMENTS

Figure 1:
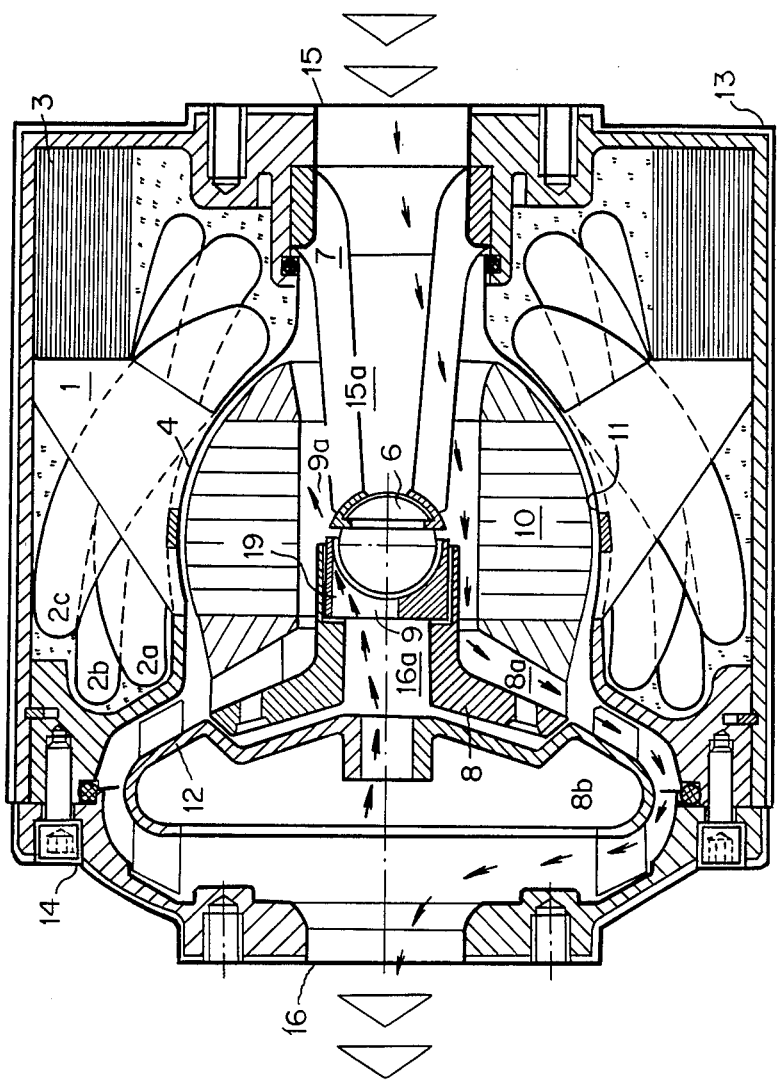
FIG. 1 shows the vertical cross section through a canned pump with the spherical bearing according to the invention.

The pump in FIG. 1 consists of
a stator, built from the pole pieces 1, penetrating the coils 2a, 2b, 2c and a yoke 3,
a separation wall 4 to separate the stator from the wet part,
the ball 6, mounted on a stationary pedestal 7,
an impeller 8 with a bearing cap 9,
the vanes 8a carrying the rotor 10, forming a spherical magnetic gap 11 with the separation wall 4,
guide wheel 12,
a motor housing 13 with an inlet flange 15, and
a pump housing 14 with an outlet flange 16.

The arrows 9a show the flow of liquid through the cap 9 from the pressure side 16a of the impeller 8 to the suction side 15a of said impeller. The passageway 8a is the main fluid channel through the pump, the flowpath is indicated by arrows 8b.

With reference to FIGS. 2 and 3 of the drawings, a spherical bearing cap 9 constructed according to the invention is seen to comprise a one-piece, generally cap-like structure configured for receipt of a ball 6 shown in FIG. 1 made out of hard compound, such as silicon carbide. The bearing cap 9 permits liquid flow removing rotational friction heat generated and prevents the undesirable accumulation of dirt and other foreign matter particles within the bearing seat. Such particles are thrown by centrifugal forces to the periphery and collected by the finger-shaped channels 19. These particles are then flushed away by the fluid entering the channels 19 from the back side 29 of the bearing cap 9.

Although other materials may be found to be satisfactory, excellent results have been obtained on construction the bearing cap 9 of polytetrafluoroethylene (P.T.F.E.) filled with carbon or a phenolic resin filled with carbon.

Although the bearing cap 9 as shown in FIG. 2 has six radially extending slot-shaped channels 19 which correspond to a practical construction of the invention, it is contemplated that fewer slots may be required in certain situations. For example as shown in FIG. 4 where the spherical bearing diameter is relatively small and rotational speeds are restricted, the number of slots required may be fewer and perhaps only one slot 30 may be needed.

Figure 6:
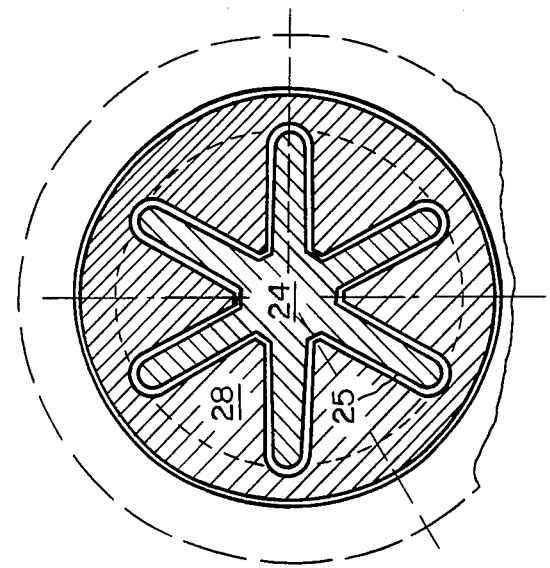
FIG. 6 is a view similar to FIG. 2, depicting an alternative number of bearing seat slots.
Figure 5:
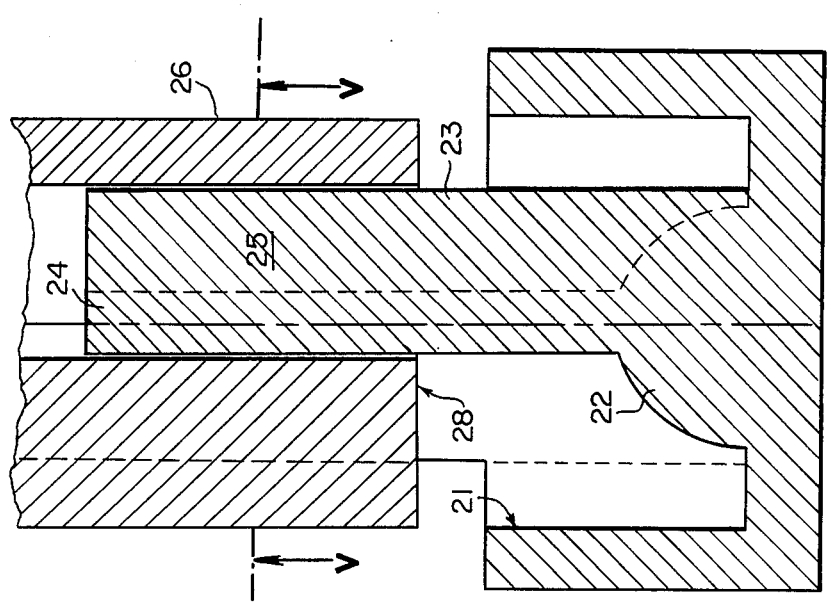
FIG. 5 is a view of the molding apparatus of FIG. 4 taken along line 4—4 of FIG. 4.

Reference is particularly made to FIGS. 5 and 6 for one technique for making the bearing cap 9. A molding part of die has a cylindrical cavity 21 formed in a surface including a convex hemispherical part 22 in its bottom wall which is identical in dimensions and geometry with the bearing cap cavity 15 of FIG. 3. An elongated molding member 23 has its lower end formed to fit onto the convex hemispherical part 22 and has a solid core 24 with radially extending fins 25 such that a transverse section as shown in FIG. 6 is seen to be identical to a plan view of the bearing seat as shown in FIG. 2. That is, the fins 25 correspond to the finger-shaped channels 19 and the core 24 to the center channel 18.

A second molding member 26 includes a hollow tube which fits precisely on the elongated molding member 23 and has internal parts 28 that fit between the fins 25 and slidingly abut against the core 24.

To make a bearing seat with the apparatus of FIGS. 5 and 6, the elongated molding member 23 is located in the die cavity 21 and positioned on the hemispherical part 22. A quantity of suitable synthetic plastic powder is placed in the cavity 21 between the fins 25 and against the core 24. Finally, second molding member 26 is lowered onto the powder, applying the required amount of pressure (and may be accompanied by simultaneous heating) to produce a rigid plastic bearing seat of the configuration shown in FIGS. 2 and 3.

I claim:

1. A canned pump-motor unit for increasing the pressure of a flux of liquid, whose motor has a stator and a rotor separated by a spherical magnetic cap, the rotor forming a rotating unit around an axis of rotation with an impeller which separates the pressure region from a suction region of the pump part of said pump motor unit, said rotating unit being supported by a spherical bearing consisting of a ball having a radius and a bearing cap, the ball being mounted on a stationary pedestal, the bearing cap forming part of the rotor-impeller-unit and riding on a surface of the ball, characterized in that the rotor impeller unit (8,10) is located between the pressure region (16a) and the suction region (15a), said bearing cap (9) having a slot shaped channel (19,30) defined by two wide and two narrow walls, said channel extending from one axial end of said bearing cap (9) to the other, the two wide walls of said channel (19,30) having a substantially longer radial extension than the radius of the ball (6), said wide walls following essentially radially aligned planes running parallel to the axis of rotation, and one of the two narrow walls of said channel running parallel to said axis of rotation at a distance which is considerably larger than the radius of the ball (6), a part of said channel which is defined by said narrow wall and adjacent parts of the two longer walls forming an aperture together with the surface of the ball (6), to cause considerable back flow of the liquid conveyed, created by the pressure of the pump, from the pressure region (16a) to the suction region (15a).

2. Canned pump-motor-unit according to claim 1 wherein a plurality of angularly separated slot shaped channels (19) are provided around the axis (31) of the bearing cap (9).

3. Canned pump-motor-unit according to claim 1 wherein the bearing cap (9) is constructed of a synthetic plastic.

4. Canned pump-motor-unit according to claim 3 wherein the synthetic plastic is polytetrafluoroethylene filled with carbon.

5. Canned pump-motor-unit according to claim 4 wherein the synthetic plastic is phenol resin filled with carbon.

* * * * *